United States Patent
Saupe et al.

(10) Patent No.: US 10,601,352 B2
(45) Date of Patent: Mar. 24, 2020

(54) METHOD OF CONTROLLING A WAVE ENERGY CONVERSION SYSTEM MAXIMIZING THE POWER OUTPUT

(71) Applicant: IFP Energies nouvelles, Rueil-Malmaison (FR)

(72) Inventors: Florian Saupe, Lyons (FR); Yann Creff, Les Cotes d'Arey (FR)

(73) Assignee: IFP Energies nouvelles, Rueil-Malmaison (FR)

(*) Notice: Subject to any disclaimer, the term of this patent is extended or adjusted under 35 U.S.C. 154(b) by 513 days.

(21) Appl. No.: 15/301,239

(22) PCT Filed: Mar. 19, 2015

(86) PCT No.: PCT/EP2015/055842
§ 371 (c)(1),
(2) Date: Sep. 30, 2016

(87) PCT Pub. No.: WO2015/150102
PCT Pub. Date: Oct. 8, 2015

(65) Prior Publication Data
US 2017/0214347 A1    Jul. 27, 2017

(30) Foreign Application Priority Data
Apr. 1, 2014  (FR) .................... 14 52885

(51) Int. Cl.
*H02P 9/00* (2006.01)
*F03B 13/18* (2006.01)
(Continued)

(52) U.S. Cl.
CPC .............. *H02P 9/008* (2013.01); *F03B 13/16* (2013.01); *F03B 13/1845* (2013.01);
(Continued)

(58) Field of Classification Search
CPC .......... H02P 9/008; F03B 13/16; F03B 15/00; F03B 13/1845; Y02E 10/38;
(Continued)

(56) References Cited

U.S. PATENT DOCUMENTS 4,781,023 A * 11/1988 Gordon .................... F03B 13/20
290/42
7,989,975 B2 * 8/2011 Clement ................. F03B 13/20
290/53
(Continued)

FOREIGN PATENT DOCUMENTS

CN        201794706       *  7/2010
FR        2876751 A1         4/2006
(Continued)

OTHER PUBLICATIONS

Wachter and Biegler, "On the implementation of an interiorpoint filter line-search algorithm for large-scale nonlinear programming", 2006, Mathematical Programming, vol. 106 (1), pp. 25-57.*
(Continued)

Primary Examiner — Juan C Ochoa
(74) Attorney, Agent, or Firm — Fitch, Even, Tabin & Flannery LLP

(57) ABSTRACT

The invention is an improved wave energy conversion system (1, 2) including a model predictive control method for an energy conversion machine (1) that maximizes the power output by accounting for the energy conversion efficiency and prediction of a wave (3).

16 Claims, 5 Drawing Sheets

(51) Int. Cl.
*F03B 13/16* (2006.01)
*F03B 15/00* (2006.01)

(52) U.S. Cl.
CPC ........ *F03B 15/00* (2013.01); *F05B 2260/821* (2013.01); *F05B 2260/84* (2013.01); *F05B 2270/1033* (2013.01); *F05B 2270/20* (2013.01); *F05B 2270/404* (2013.01); *Y02E 10/38* (2013.01)

(58) Field of Classification Search
CPC ............ F05B 2270/404; F05B 2270/20; F05B 2260/84; F05B 2260/821; F05B 2270/1033
USPC .................................................... 703/2, 4, 7
See application file for complete search history.

(56) References Cited

U.S. PATENT DOCUMENTS

| | | | | |
|---|---|---|---|---|
| 2002/0047273 | A1* | 4/2002 | Burns | F03B 13/148 290/53 |
| 2010/0038912 | A1* | 2/2010 | McCarthy | F03B 13/142 290/53 |
| 2010/0148504 | A1* | 6/2010 | Gerber | F03B 13/16 290/42 |
| 2011/0074159 | A1* | 3/2011 | Stromotich | F03B 13/181 290/53 |
| 2012/0001432 | A1 | 1/2012 | Clement et al. | |
| 2013/0229011 | A1 | 9/2013 | Kawaguchi et al. | |
| 2014/0084586 | A1 | 3/2014 | Henwood et al. | |
| 2014/0191624 | A1* | 7/2014 | Jahshan | H02K 35/02 310/68 B |

FOREIGN PATENT DOCUMENTS

| | | | |
|---|---|---|---|
| FR | 2973448 | A1 | 10/2012 |
| WO | 2009/081042 | A1 | 7/2009 |

OTHER PUBLICATIONS

Giorgio Bacelli, John Ringwood and Jean-Christophe Gilloteaux, "A control system for a Self-Reacting Point Absorber Wave Energy Converter Subject to Constraints," in: Proceedings of 18th IFAC World Congress, International Federation of Automatic Control (IFAC), pp. 11387-11392. 2011.

International Search Report for PCT/EP2015/055842 dated Jun. 30, 2015; English translation submitted herewith (7 Pages).

* cited by examiner

METHOD OF CONTROLLING A WAVE ENERGY CONVERSION SYSTEM MAXIMIZING THE POWER OUTPUT

CROSS REFERENCE TO RELATED APPLICATIONS

Reference is made to International Application No. PCT/2015/055842 filed Mar. 19, 2015, and French Application No. 14/52.885 filed Apr. 1, 2014, which applications are incorporated herein by reference in their entirety.

BACKGROUND OF THE INVENTION

Field of the Invention

The invention relates to the field of devices for converting wave energy in to electrical or hydraulic energy.

Description of the Prior Art

Renewable energy resources have generated strong interest for some years. They are clean, free and inexhaustible, which are major assets in a world facing the inexorable depletion of the available fossil resources and recognizing the need to preserve the planet. Among these resources, wave energy, a source relatively unknown amidst those widely publicized, such as wind or solar energy, contributes to the vital diversification of the exploitation of renewable energy sources. The devices, commonly referred to as "wave energy conversion devices", are particularly interesting because they allow electricity to be produced from this renewable energy source (the potential and kinetic wave energy) without greenhouse gas emissions. They are particularly well suited for providing electricity to isolated island sites.

BACKGROUND OF THE INVENTION

For example, patent applications FR-2,876,751, FR-2,973,448 and WO-2009/081,042 describe devices which capture the energy produced by sea water forces. These devices are made up of a floating support structure on which a pendulum is movably mounted with respect to the floating support. The relative motion of the pendulum with respect to the floating support is used to produce electrical energy by an energy converter machine (an electrical machine for example). The converter machine operates as a generator and as a motor. Indeed, in order to provide a torque or a force driving the mobile energy source, power is supplied to the converter machine to bring it into resonance with the waves (motor mode). On the other hand, to produce a torque or a force that withstands the motion of the mobile source, power is recovered via the converter machine (generator mode).

The motion of the mobile source is thus controlled by the energy converter machine to promote energy recovery. In order to optimize the electrical energy recovered by wave energy conversion systems, various converter machine control methods have been considered. Some are not optimal because the wave motion prediction is not taken into consideration. Furthermore, these methods do not account for the energy losses which occur during energy conversion in the wave energy conversion system. For example, patent application FR-2,973,448 (WO-2012/131,186) describes such a method.

Other methods combine model predictive control with a wave motion prediction algorithm. However, these algorithms do not allow the energy losses consequent from energy conversion with the wave energy conversion system to be taken into account. This does not enable to an optimum control maximizing the recovered energy. For example, the following document describes such a method: Giorgio Bacelli, John Ringwood and Jean-Christophe Gilloteaux, "A control system for a Self-Reacting Point Absorber Wave Energy Converter Subject to Constraints", in: Proceedings of 18$^{th}$ IFAC World Congress, International Federation of Automatic Control (IFAC), 2011, pp. 11387-11392.

SUMMARY OF THE INVENTION

The invention improves the operation of a wave energy conversion system by use of a predictive control method using a model which provides an energy conversion machine that maximizes the power output by accounting for energy conversion efficiency and wave motion prediction.

The invention is a method for controlling a wave energy conversion system that converts the energy of waves into electrical or hydraulic energy. The wave energy conversion system comprises at least one mobile system that cooperates with at least one energy conversion machine, and the mobile system has an oscillating motion with respect to the energy conversion machine. For this method, the following stages are carried out:

a) constructing a dynamic model of the wave energy conversion system relating the velocity of the mobile system to the force exerted by the waves on the mobile system and to the force exerted by the energy conversion machine on the mobile system, b) constructing an energy model of the wave energy conversion system relating an average power generated by the energy conversion machine to the force exerted by the energy conversion machine on the mobile system, to the velocity of the mobile system and to an efficiency of the wave energy conversion machine system;

c) predicting a force exerted by the waves on the mobile system for a predetermined time period;

d) determining a control value of the force exerted by the wave energy conversion machine on the mobile system maximizing the average power generated by the wave energy conversion machine, by use of the prediction of a force exerted by the waves on the mobile system, of the dynamic model and of the other wave energy model; and e) controlling the converter machine by system of a control value.

According to a variant embodiment of the invention, the force exerted by the waves on the mobile system is predicted by at least one measurement or one estimation of the force exerted by the waves on the mobile system, using a set of pressure detectors arranged in a vicinity of the mobile system or force sensors arranged between the mobile system and the wave energy conversion machine.

Alternatively, the force exerted by the waves on the mobile system is predicted by measuring waves upstream from the wave energy conversion system.

Advantageously, the dynamic model of the wave energy conversion system is constructed by use of a model of dynamics of the energy conversion machine and of a model of a mechanical part and a hydrodynamic part of the energy conversion system.

Preferably, a model of the dynamics of the wave energy conversion machine is written using equations of the form: $x_a = A_a^c x_a + B_a^c u_c$ and $u = C_a^c x_a$, and the model of a mechanical part and a hydrodynamic part is written using equations of the form: $x_s = A_s^c x_s + B_s^c (w-u)$ and $v = C_s^c x_s$, with $x_a$ being the state vector of the converter machine, $x_s$ being the state vector of a mechanical part and a hydrodynamic part, $A_a^c$, $B_a^c$, $C_a^c$, $A_s^c$, $B_s^c$ and $C_s^c$ being dynamic matrices, inputs, being outputs of a dynamic model of the wave energy conversion machine and of the mechanical part and the hydrodynamic part, $u_c$ being the control of the force exerted by the energy conversion machine on the mobile system, w being the control of the force exerted by the waves on the mobile system, u being the force exerted by the energy conversion machine on the mobile system and v being the velocity of mobile system in relation to the wave energy conversion machine.

Advantageously, a Kalman filter is notably synthesized from the two linear models by using a state observer modeling the state of the mobile system.

According to an aspect of the invention, the wave energy conversion model is written with a formula of the type:

$$P_m^c = -\frac{1}{T}\int_{t=0}^{T} \eta uv \, dt,$$

with $P_m^c$ being an average power output, t time, T being a predetermined duration, η being an energy conversion efficiency, u being a force exerted by the converter machine on the mobile system and v being velocity of the mobile system in relation to the wave energy converter machine.

Advantageously, the energy conversion efficiency η is a function of force u exerted by the converter machine on the mobile system and of velocity v of the mobile system in relation to the wave energy conversion machine.

According to a variant embodiment, the efficiency η is calculated with a formula of the type:

$$\eta(uv) = \begin{cases} \eta_0 & \text{if } uv \geq 0 \\ \dfrac{1}{\eta_0} & \text{if } uv < 0 \end{cases}$$

with $\eta_0$ being motor and generator efficiency of the wave energy conversion machine, with $0 \leq \eta_0 \leq 1$.

Alternatively, the efficiency η is calculated with a formula of the type:

$$\eta(uv) = -\frac{\dfrac{1}{\eta_0} - \eta_0}{\pi} \arctan\left(\frac{\pi r_a uv}{2}\right) + \frac{\dfrac{1}{\eta_0} - \eta_0}{2} + \eta_0$$

with $\eta_0$ being motor and generator efficiency of the wave energy conversion machine, with $0 \leq \eta_0 \leq 1$, and $r_a$ being a smoothing parameter of the function.

According to the invention, maximizing average power output is achieved by an optimization algorithm constrained by minimum and maximum values of force exerted by the energy conversion machine on the mobile system and constraints on a state of the system.

Preferably, maximization of an average power output is an optimization algorithm of an interior point type.

According to an embodiment of the invention, c), d) and e) are repeated for a model of predictive control with moving horizon.

Advantageously, the wave energy conversion machine is an electrical or hydraulic machine.

BRIEF DESCRIPTION OF THE DRAWINGS

Other features and advantages of the method according to the invention will be clear from reading the description hereafter, with reference to the accompanying figures wherein.

DETAILED DESCRIPTION OF THE INVENTION

The invention is a method of controlling a wave energy conversion system that comprises at least one mobile system cooperating with at least one wave energy conversion machine also referred to as Power Take-Off (PTO). The mobile system has an oscillating motion with respect to the wave energy conversion machine, under the action of the waves (or wave motion) and of the wave energy conversion machine. The wave energy conversion machine converts mechanical energy of motion of the mobile system into electrical energy. The wave energy conversion machine can therefore be an electric or a hydraulic machine.

Notations

The following notations are used in the description below:
u is force exerted by the converter machine on the mobile means, and
  $u_c$ is control value of force exerted by the wave energy conversion machine on the mobile system,
w is force exerted by waves on the mobile system,
v is velocity of the mobile system in relation to the converter machine,
$x_a$ is a state vector of the wave energy conversion machine of the wave energy conversion system;
$x_s$ is a state vector of a mechanical and a hydrodynamic part of the wave energy conversion system;
$A_a^c$, $B_a^c$, $C_a^c$, $A_s^c$, $B_s^c$ and $C_s^c$ are dynamic matrices, inputs, outputs of dynamic models of the wave energy conversion machine and of the mechanical and the hydrodynamic part. The model can be calculated by a balance of forces or an experimental identification procedure. If the model is linear, it can be represented by matrices (it is a formalism), with:

$P_m^c$, being average power output;

t being time;

$T_f$ being a predetermined duration;

η being an energy conversion efficiency; with $η_0$ being motor and generator efficiency of the wave energy conversion machine; these are manufacturer's data or experimentally determined data; and $r_a$ is a predetermined smoothing parameter of an efficiency function.

In the description below and in the claims, the terms waves, sea waves and wave motion are considered to be equivalent.

Figure 1:
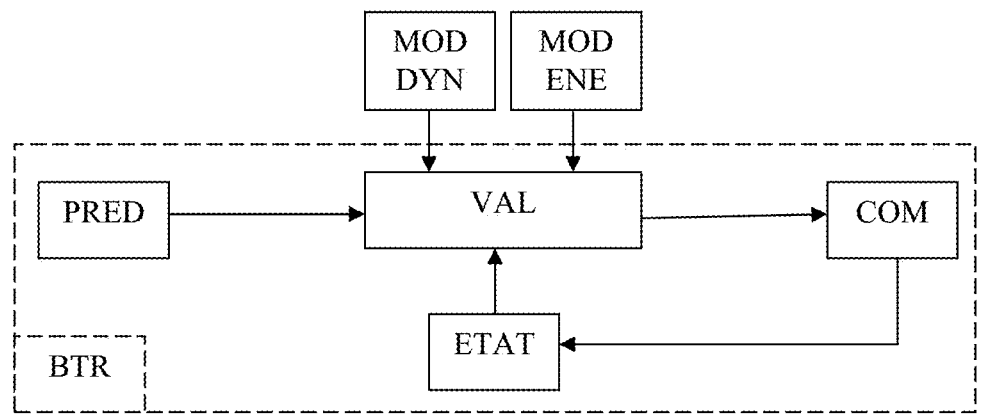
FIG. 1 illustrates stages of the method according to the invention.

The invention relates to a method of controlling a wave energy conversion system. FIG. 1 shows the various stages of the method according to the invention:

1. Construction of a dynamic model (MOD DYN)
2. Construction of an energy model (MOD ENE)
3. Prediction of the force exerted by the waves (PRED)
4. Estimation of the state of the system (ETAT)
5. Determination of the control value (VAL)
6. Control of the converter machine (COM).

Stages 1 and 2 are stages that can be carried out beforehand and are part of a calibration procedure when the machine is installed. Stages 3 to 6 are carried out in real time, in a real-time loop (BTR).

Stage 1—Construction of a Dynamic Model (MOD DYN)

In this stage, a dynamic model of the wave energy conversion system is constructed. The dynamic model represents the dynamic behavior reflecting the motion of the elements making up the wave energy conversion system under action of waves and under action of the wave energy conversion machine. The dynamic model is a model that relates velocity of the mobile system to a force exerted by the on the mobile system and to force exerted by the wave energy conversion machine on the mobile system.

According to an embodiment of the invention, the dynamic model can comprise a linear model of dynamics of the wave energy conversion machine. This linear model can be written in form as follows: $x_a = A_a^c x_a + B_a^c u_c$ and $u = C_a^c x_a$. The dynamic model can also comprise a linear model of a mechanical part and a hydrodynamic part of the wave energy conversion system. This linear model can be written in the form as follows: $x_s = A_s^c x_s + B_s^c (w-u)$ and $v = C_s^c x_s$.

Stage 2—Construction of an Energy Model (MOD ENE)

In this stage, an energy model of the wave energy conversion system is constructed. The energy model represents an energy balance between the energy generated by the wave energy conversion machine (that is the energy supplied to the grid) and the wave energy. According to the invention, this model accounts for an imperfect efficiency of conversion of, mechanical energy into electrical or hydraulic energy, and of the imperfect efficiency of conversion of electrical or hydraulic energy into mechanical energy. The energy model relates the average power generated by the wave energy conversion machine to a force exerted by the wave energy conversion machine on the mobile system, to velocity of the mobile system and to efficiency of energy converters.

According to an embodiment of the invention, the energy model of the wave energy conversion system can be determined from the average power that is extracted for a duration T, which can be calculated with a formula of the type:

$$P_m^c = -\frac{1}{T}\int_{t=0}^{T} \eta uv \, dt.$$

The definition of the above average power output is such that the average power has a negative sign if the energy is extracted from the system and for example supplied to the power grid. A maximization of the average power output therefore corresponds to a minimization of this power.

According to the invention, function η, which is the wave energy conversion efficiency, is used to model an imperfect efficiency of the energy conversion chain. In this case, the amount of energy generated in motor mode is decreased and a cost of energy supplied to the system (to bring it into resonance with the waves in motor mode) increases. A simple model using the hypothesis that efficiency $η_0$ is the same in motor and generator mode can be written with a first equation (Eq 1):

$$\eta(uv) = \begin{cases} \eta_0 & \text{if } uv \geq 0 \\ \dfrac{1}{\eta_0} & \text{if } uv < 0 \end{cases}.$$

Another possibility for modelling efficiency η avoiding the use of a discontinuity can be written with a second equation (Eq 2):

$$\eta(uv) = -\frac{\frac{1}{\eta_0} - \eta_0}{\pi}\arctan\left(\frac{\pi r_a uv}{2}\right) + \frac{\frac{1}{\eta_0} - \eta_0}{2} + \eta_0.$$

Figure 2:
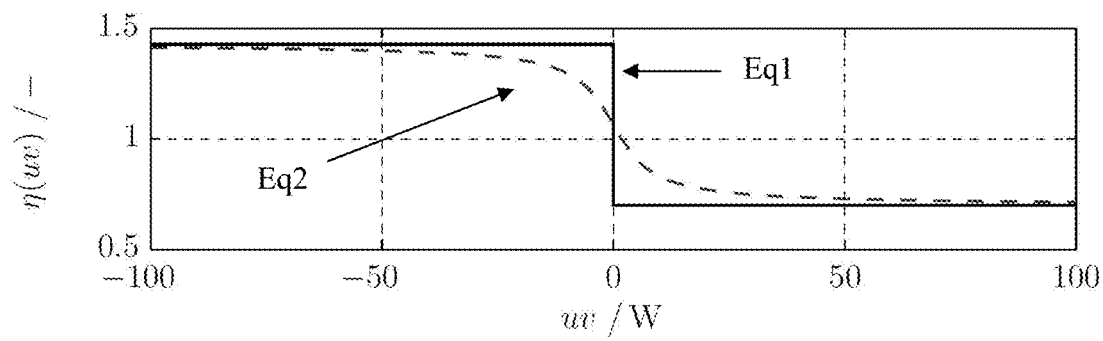
FIG. 2 illustrates two curves for two examples of equations of efficiency as a function of an instantaneous mechanical power (product uv)

The two options (Eq 1 and Eq 2) are illustrated in FIG. 2 as a function of product uv. The discontinuity of the first equation (Eq 1), unlike the second equation (Eq 2), can be observed in this figure. Function can also model other energy losses.

Stage 3—Prediction of the Force Exerted by the Waves (PRED)

In this stage, force exerted by the waves on the mobile system is predicted in real time for a future period of predetermined duration $T_f$. This predetermined duration $T_f$ can be short, ranging for example from 5 to 10 seconds. A prediction method is then selected and applied to the time being considered.

According to an embodiment of the invention, one option is estimating or measuring in real time force exerted on the mobile system by the wave motion, with for example a set of pressure detectors arranged in a vicinity of the mobile system or force sensors arranged between the mobile system and the wave energy conversion machine, or wave elevation sensors. For the prediction, the force exerted on the mobile means by the wave motion can be extrapolated using, for example, an autoregressive model identified online.

According to an alternative, the force exerted by waves on the mobile system is predicted using a set of detectors arranged upstream from the device. These detectors can notably measure the amplitude and the frequency of the waves.

Stage 4—Estimation of the State of the System (ETAT)

The current state of the wave energy conversion system is determined in real time. For this stage, the current state can be estimated by use of a system state observer. This state observer can be achieved by synthesis of a Kalman filter from a dynamic model of the wave energy conversion system. For example, the observer is constructed from the linear models described in stage 1.

Furthermore, the observer can take current control of the converter machine into account to determine a current state of the wave energy conversion system, for example by use of control at times preceding the time being considered.

Stage 5—Determination of the Control Value (VAL)

In this stage, a Control value of the force exerted by the wave energy conversion machine on the mobile system is determined in real time. The control value maximizes the average power generated by the converter machine. Determination is therefore performed using prediction of force exerted by the waves (Stage 3), the dynamic model (Stage 1) and an energy model (Stage 2). Furthermore, this determination can be achieved by taking a state of the system into account (Stage 4).

Using prediction of the force exerted by the waves gives the predictive characteristic of the control method according to the invention. Using an energy model accounting for energy conversion efficiency involves consideration energy losses, which enables an optimum control that maximizes the average power generated by the wave energy conversion machine.

Figure 3:
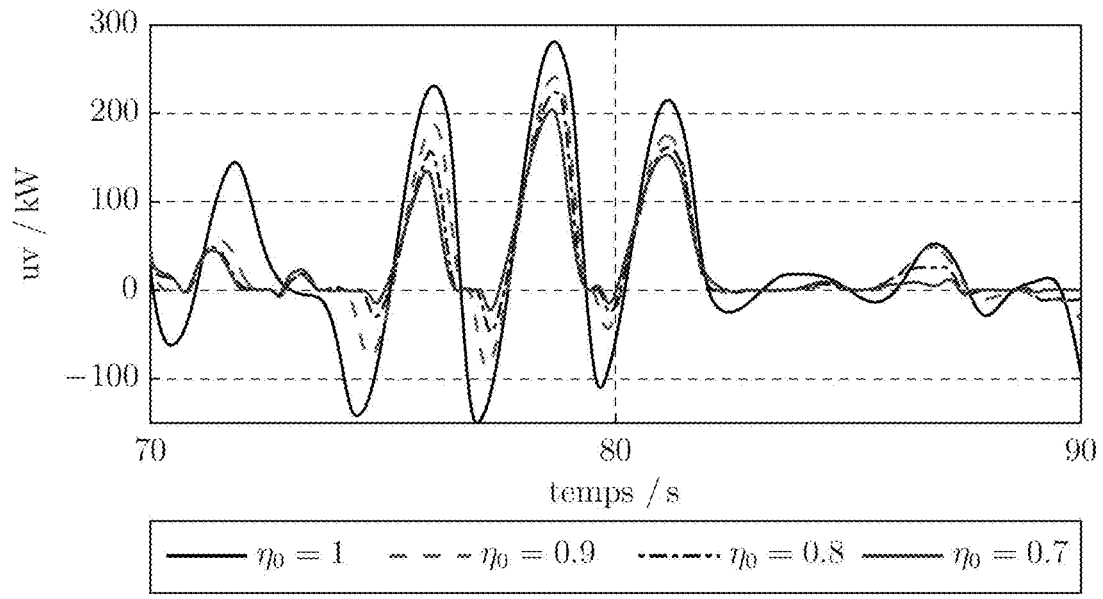
FIG. 3 illustrates curves of an instantaneous mechanical power (product uv) as a function of time for various efficiency values.

Indeed, if efficiency η is different from 1, the product between control u and optimum velocity v changes significantly due to cost of the energy supplied to the machine, notably related to the energy losses, as shown in FIG. 3. In this figure, the curves show, for one example, product uv as a function of time for different values of efficiency $\eta_0$, which is why it is important to take efficiency into account in the calculation of the control.

With the formulations of the dynamic and energy models, the search for the optimum control with constraints on control u and on the state of the system x can be formulated in a general manner: $\min_{u_c} P_m^c$, as a function of the models and the following constraints: $u_{min} < u < u_{max}$ and $x_{min} < x < x_{max}$. For minimization of the average power output, variable can be parameterized. One option is to select a variable $u_c$ that is piecewise constant.

According to an embodiment of the invention, maximization of the average power output $P_m^c$ is performed by use of an optimization algorithm.

According to a variant embodiment of the invention, in order to smooth the control and to avoid unwanted oscillations, a penalty for the variations of $u_c$ can be added to the target function.

According to an embodiment of the invention, a model predictive control (MPC) with a moving horizon is applied for real-time calculation of a control:

1. At a current step, step i which is the state of the system is estimated (stage 4) and the wave force is predicted (stage 3). The optimum control on a horizon limited to the predetermined period T (around 5 sec) is calculated from these values. This gives a series of optimum controls $u_{c,i}$ of length n.

2. The first element of the series of optimum controls $u_{c,i}$ is applied to the system as the target value for the converter machine (PTO). The value is maintained constant during a time step.

3. At a next step, step i+1, a state of the system is estimated (stage 4) and the wave force is predicted (stage 3). The optimum control on a horizon limited to the predetermined period T is calculated from these values. The initial values for this optimization are selected from results of a previous step (from the second input of $u_{c,i}$ to the last value that is repeated once). Optimization provides a new series of optimum controls $u_{c,i+1}$ of length n.

4. The first element of the new series of optimum controls $u_{c,i+1}$ is applied.

These stages 1 to 4 are repeated for each time step.

Figure 4:
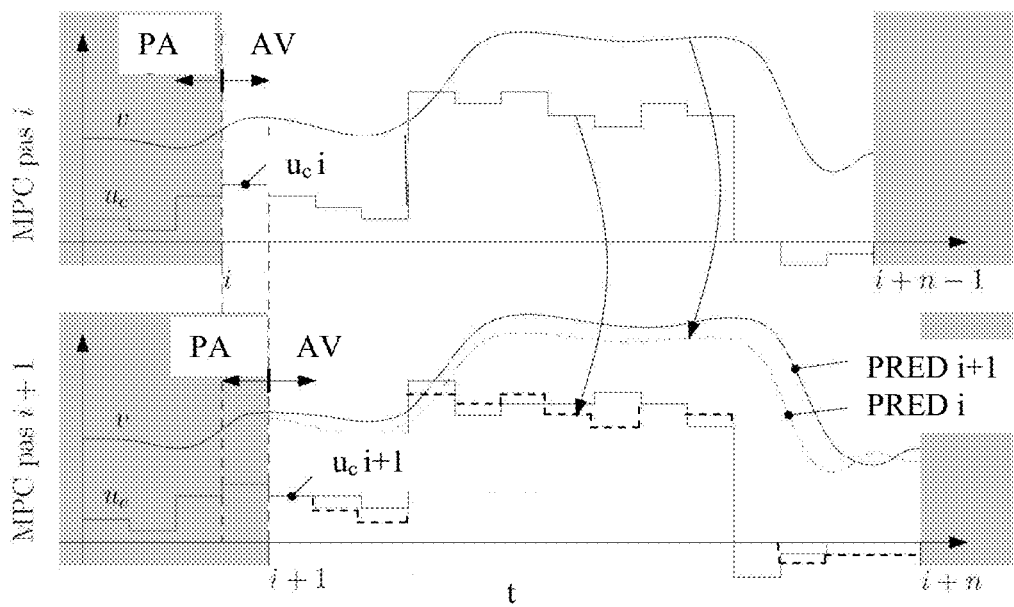
FIG. 4 illustrates a model of predictive control with a moving horizon according to the invention.

This model predictive control (MPC) with moving horizon is illustrated in FIG. 4. This figure shows the velocity v and control $u_c$ curves for two consecutive time steps: i and i+1. PA indicates the past of the considered time, AV is the future of the considered time, PRED i indicates the velocity prediction at time i and PRED i+1 is the velocity prediction at time i+1. It can be noted in this figure that the prediction has been modified between the two-time steps, even though the general form is similar. It can also be observed that the control has been slightly modified between the two-time steps.

The algorithms that solve optimization problems are iterative algorithms. Since the time allowed for executing them is limited in real time, it is important for all the steps to give solutions that satisfy the constraints, in cases where it would be necessary to end the algorithm before convergence. An algorithm providing upon each iteration values that satisfy the constraints, such as for example an algorithm of interior point type, can be used to solve the optimization problem that gives the optimum control.

Stage 6—Control of the Converter Machine (COM)

In this stage, the converter machine is controlled as a function of value determined in the previous stage. The wave conversion energy machine (electrical or hydraulic machine) is therefore actuated to reproduce a new value of force $u_c$ as determined in stage 5.

For example, a new expression of force $u_c$ exerted by the wave energy conversion machine on the mobile system is applied to the electrical machine. Controlling the electrical machine so that it applies force $u_c$ to the mobile system is achieved by modifying the electrical current applied to the electrical machine. More precisely, to provide a torque or a force that drives the mobile system, a current is applied by supplying an electrical power.

On the other hand, to produce a torque or a force withstanding the motion of the mobile system, a current is applied by recovering electrical power.

Figure 9:
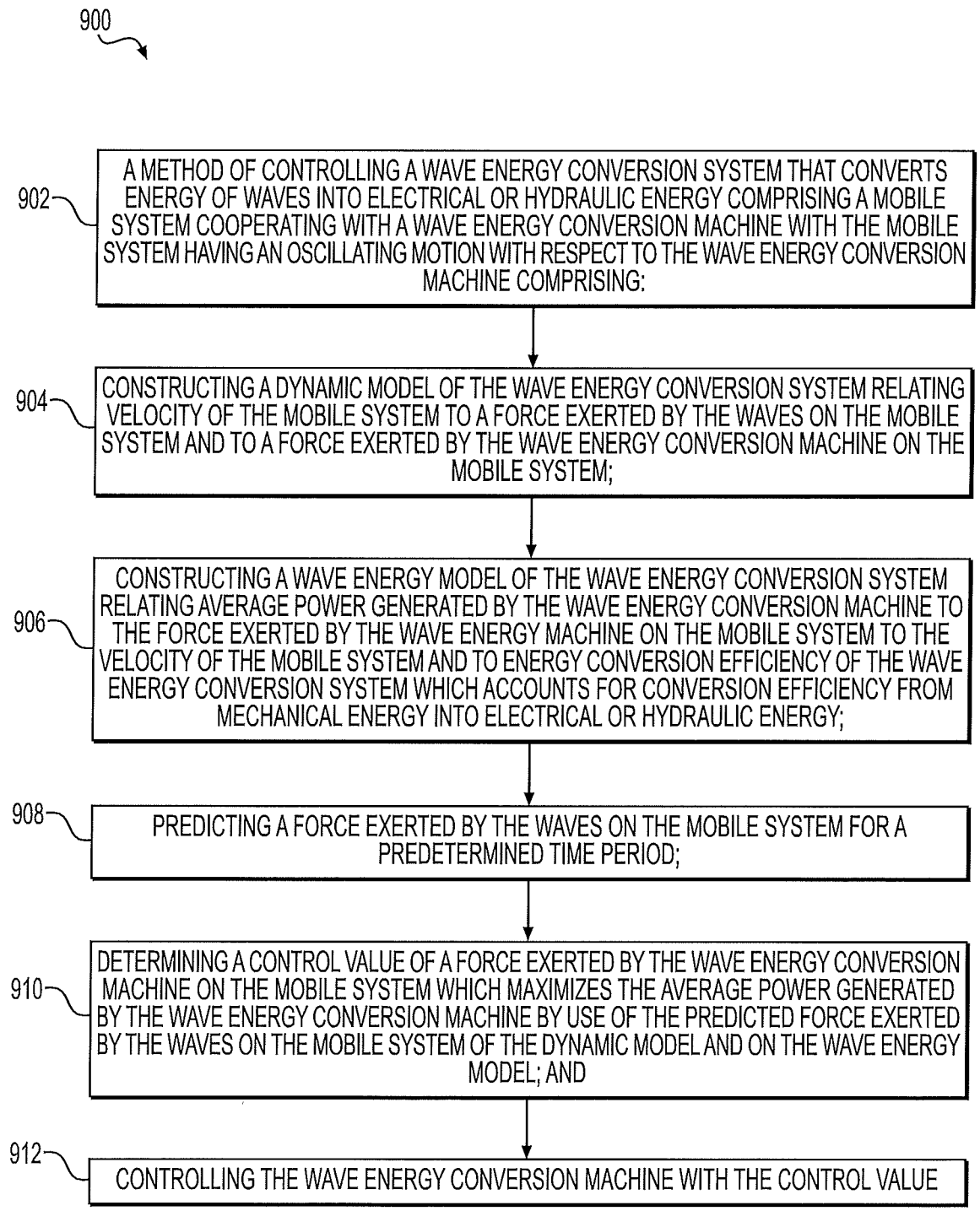
FIG. 9 is a flow chart the method of controlling wave energy conversion system that converts energy of waves into electrical or hydraulic energy comprising a mobile system cooperating with the wave energy conversion machine the mobile system having an oscillating motion with respect to the wave energy system.

FIG. 9 illustrates an example 900 of a method relates to a method 902 of which is controlling a wave energy conversion system that converts energy of waves into electrical or hydraulic energy comprising a mobile system cooperating with a wave energy conversion machine with the mobile system having an oscillating motion with respect to the wave energy conversion machine. The steps of the method start with step 904 which constructs a dynamic model of the wave energy conversion system relating velocity of the mobile system to a force exerted by the waves on the mobile system and to a force exerted by the wave energy conversion machine on the mobile system. The method then proceeds to step 906 which constructs a wave energy model of the wave energy conversion system relating average power generated by the wave conversion machine to the force exerted by the wave energy machine on the mobile system to the velocity of the mobile system and to energy conversion efficiency of the wave energy conversion system which accounts for conversion efficiency from mechanical energy into electrical or hydraulic energy. The method they proceed to step 908 which predicts a force exerted by the waves on the mobile system for a predetermined time period. Then the method proceeds to step 910 which determines a control value of a force exerted by the wave energy conversion machine on the mobile system which maximizes the average power generated by the wave energy conversion machine by use of the predicted force exerted by the waves on the mobile system of the dynamic model and on the wave energy model. Finally, at step 912 controlling the wave energy of conversion machine with the control value occurs.

Application Example

Figure 5:
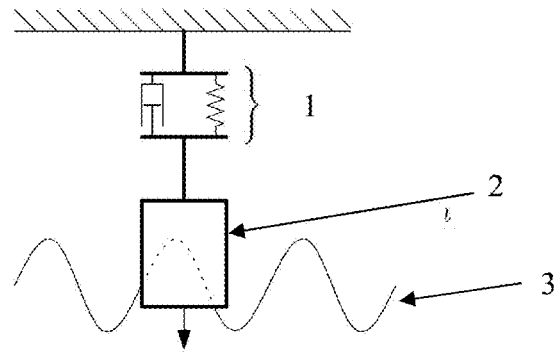
FIG. 5 illustrates an example of a wave energy conversion system.

A non-limitative example of a wave energy conversion system is an oscillating buoy as shown in FIG. 5. This wave energy conversion system comprises a buoy 2 as the mobile means of mass m, a converter machine 1 of damping d and elasticity k that is stationary. The buoy is subjected to an oscillating motion through waves 3 and to hydraulic forces (ordinary differential equation ODE of order 5).

Figure 6:
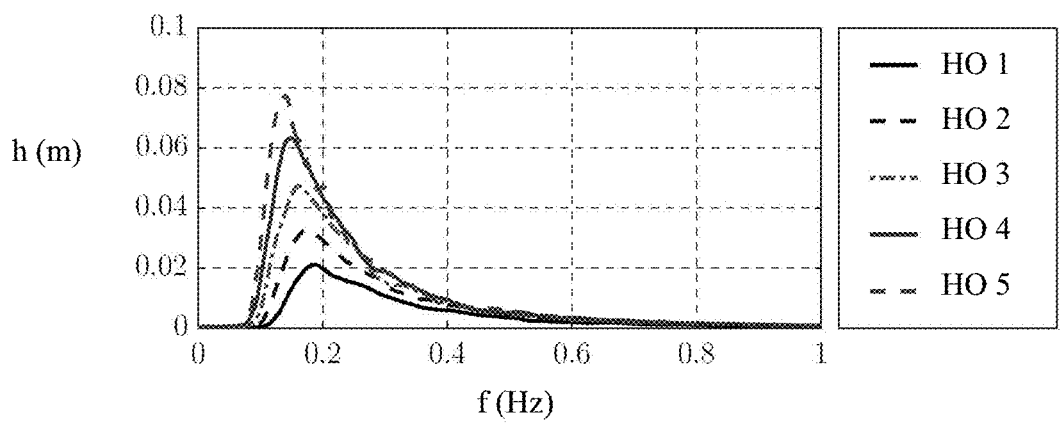
FIG. 6 illustrates an amplitude as a function of frequency of various wave motion types which are simulated.

In this example, a model predictive control MPC is compared with a moving horizon according to the invention with a PI (Proportional Integral) control according to the prior art. Five different sea states are considered, whose (smoothed) spectra are shown in FIG. 6. This figure shows the curves, for five sea states (wave motions HO 1, HO 2, HO 3, HO 4 and HO 5), of the wave elevation h in meters as a function of frequency fin Hertz.

For the control according to the invention, the dynamic model takes into account the dynamics of the mechanical part and hydrodynamic part with a fifth-order linear system and the actuator dynamics with a second-order linear system. The wave energy conversion machine stress is limited and the non-linear efficiency, corresponding to $$\eta(uv) = \begin{cases} \eta_0 & \text{if } uv \geq 0 \\ \dfrac{1}{\eta_0} & \text{if } uv < 0 \end{cases},$$

with $\eta_0 = 0.7$, is modelled and a saturation of the control can be achieved.

A conventional control according to the prior art wave energy conversion system couples the PTO control on the velocity of the mobile system via a PI control:

$$u_c = k_p \int_{t_0}^t v d\tau - k_\upsilon v.$$

For the comparison with the model predictive control according to the invention, has gains $^k p$ and $^k \upsilon$ which are optimally calibrated for all the sea states being considered.

The results of the comparison between the MPG strategy according to the invention (INV) and the PI strategy according to the prior art (AA) are summed up in Table 1. The energy generation gain ranges between 16% and 50%.

TABLE 1

Average power of the model predictive control and of a conventional PI control

|  | $P_m$ PI (AA)/kW | $P_m$ MPC (INV)/kW | Gain $P_m$ | Max. pos. ratio (MPC/PI) | Max. vel. ratio (MPC/PI) |
|---|---|---|---|---|---|
| Wave motion 1 | −2.83 | −4.26 | 50.43% | 1.31 | 1.48 |
| Wave motion 2 | −8.64 | −11.89 | 37.54% | 0.89 | 0.88 |
| Wave motion 3 | −16.42 | −20.76 | 26.44% | 0.81 | 0.91 |
| Wave motion 4 | −24.44 | −29.26 | 19.75% | 0.88 | 0.91 |
| Wave motion 5 | −32.14 | −37.14 | 15.55% | 0.90 | 0.97 |

Figure 7:
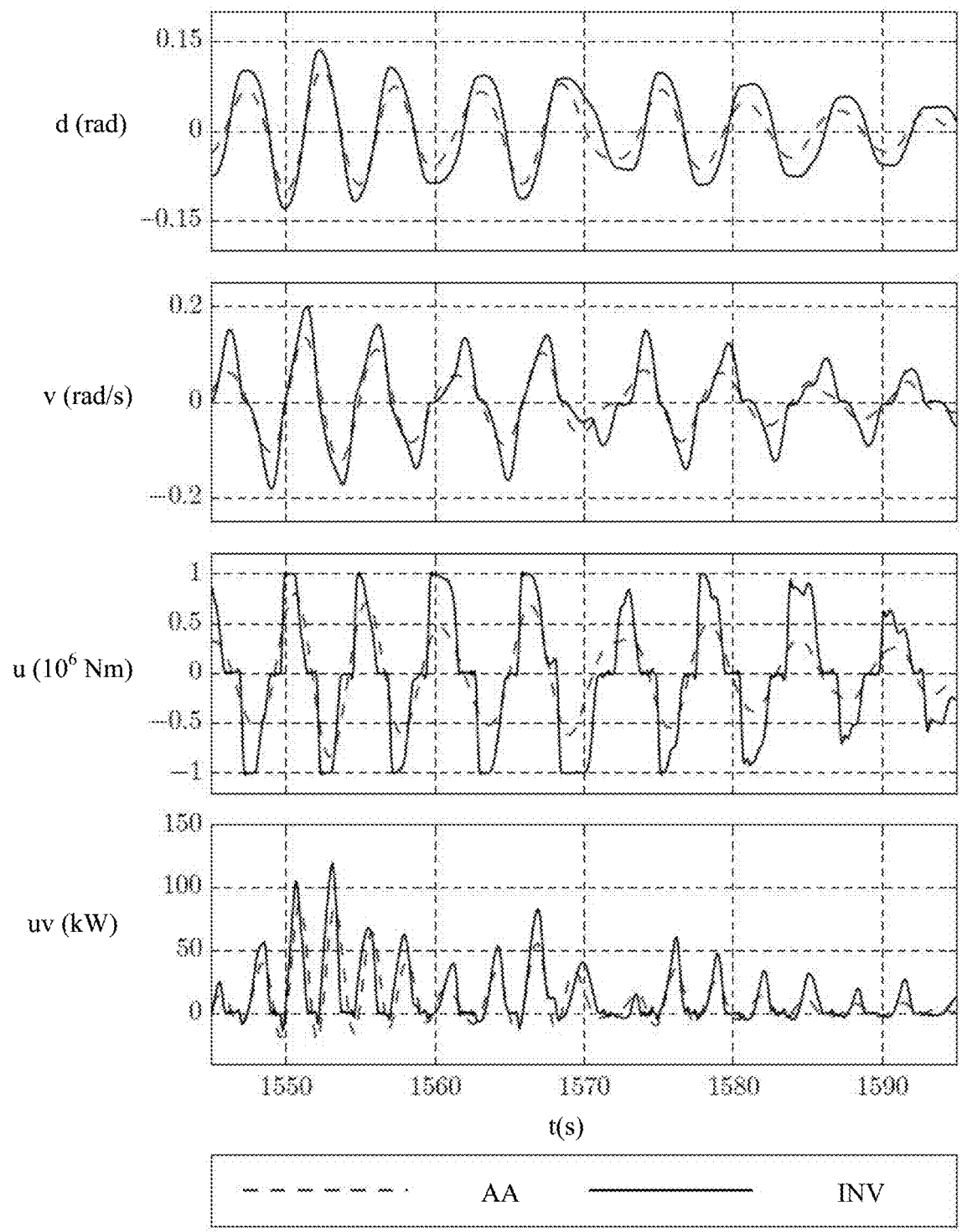
FIG. 7 shows curves relative to displacement, velocity, control and instantaneous mechanical power (product uv) for the wave energy conversion system of FIG. 5 and a wave motion of HO 1 type of FIG. 6 according to a method of the prior art and according to the control method of the invention.
Figure 8:
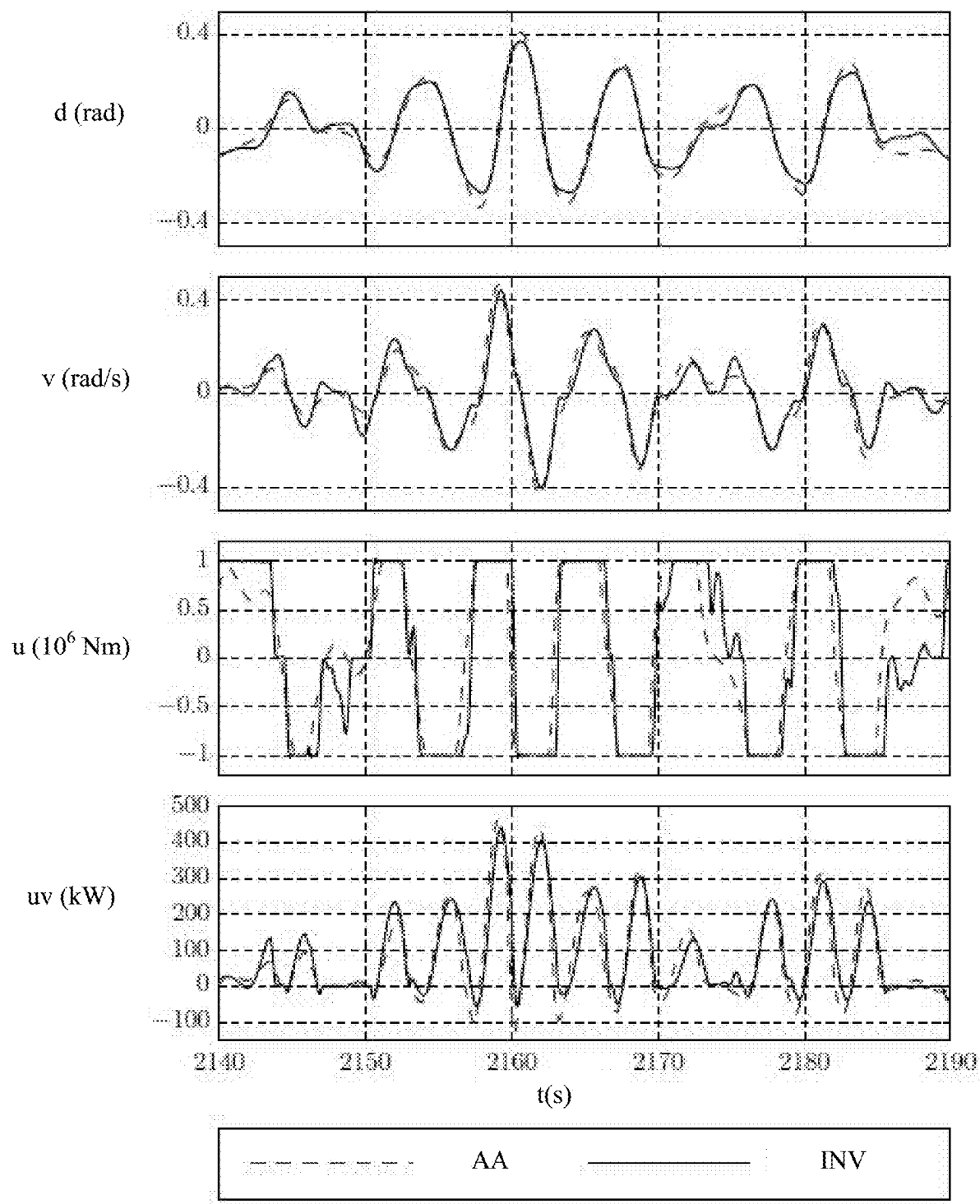
FIG. 8 corresponds to FIG. 7 for a wave motion of HO 5 type in FIG. 6.

The trajectory of the system d is in rad, velocity v is in rad/s, control u is in $10^6$ Nm and product uv is in kW, controlled by MPC (INV) and PI (AA), as shown in FIGS. 7 and 8 respectively for a wave motion seq states HO 1 and HO 5 (see FIG. 6). It can be seen that the maximum position and the maximum velocity are reduced (except in the case of wave motion HO 1, which is very weak and does not excite high oscillations).

The invention claimed is:

1. A method of controlling a wave energy conversion system that converts energy of waves into electrical or hydraulic energy comprising a mobile system cooperating with an electric machine or a hydraulic machine, the mobile system having an oscillating motion with respect to the electric machine or the hydraulic machine comprising:
    a) constructing a dynamic model of the wave energy conversion system relating velocity of the mobile system to a force exerted by the waves on the mobile system and to force exerted by the electric machine or the hydraulic machine on the mobile system;
    b) constructing a wave energy model of the wave energy conversion system relating average power generated by the electric machine or the hydraulic machine to the force exerted by the electric machine or the hydraulic machine on the mobile system to the velocity of the mobile system and to energy conversion efficiency of the wave energy conversion system, the wave energy model accounts for conversion efficiency from mechanical energy into electrical or hydraulic energy with the wave energy model being expressed as a formula $$P_m^c = -\frac{1}{T}\int_{t=0}^{T} \eta uv dt,$$

with $P_m^c$ being average power output, t being time, T being a predetermined duration, $\eta$ being energy conversion efficiency, u being force exerted by the electric machine or the hydraulic machine on the mobile system and v being velocity of the mobile system in relation to the electric machine or the hydraulic machine;
    c) predicting a force exerted by waves on the mobile system for a predetermined time period;
    d) determining a control value of a force exerted by the electric machine or the hydraulic machine on the mobile system which maximizes the average power generated by the electric machine or the hydraulic machine by use of the predicted force exerted by the waves on the mobile system of the dynamic model of the wave energy conversion system and on the wave energy model of the wave energy conversion system; and
    e) controlling the electric machine or the hydraulic machine with the control value.

2. A method as claimed in claim 1, wherein the force exerted by the waves on the mobile system is predicted by at least one of a measurement and an estimation of the force exerted by the waves on the mobile system using a set of pressure detectors associated with the mobile system associated with force sensors between the mobile system and the electric machine or the hydraulic machine.

3. A method as claimed in claim 1, wherein the force exerted by the waves on the mobile system is predicted by measurement of waves upstream from the wave energy conversion system.

4. A method as claimed in claim 1, wherein the dynamic model of the wave energy conversion system is constructed using a model of dynamics of the electric machine or the hydraulic machine and of a model of a mechanical part and a hydrodynamic part of the wave energy conversion system.

5. A method as claimed in claim 2, wherein the dynamic model of the wave energy conversion system is constructed using a model of dynamics of the electric machine or the hydraulic machine and of a model of a mechanical part and a hydrodynamic part of the wave energy conversion system.

6. A method as claimed in claim 3, wherein the dynamic model of the wave energy conversion system is constructed using a model of dynamics of the electric machine or the hydraulic machine and of a model of a mechanical part and a hydrodynamic part of the wave energy conversion system.

7. A method as claimed in claim 4, wherein the dynamic model of the electric machine or the hydraulic machine is expressed with equations: $x_a = A_a^c x_a + B_a^c u_c$ and $u = C_a^c x_a$, and the model of the mechanical part and the hydrodynamic part as: $x_s = A_s^c x_s + B_s^c (w-u)$ and $v = C_s^c x_s$, with $x_a$ being a state vector of the electric machine or the hydraulic machine, $x_s$ being a state vector of the mechanical part and the hydrodynamic part, $A_a^c$, $B_a^c$, $C_a^c$, $A_s^c$, $B_s^c$ and $C_s^c$ being dynamic matrices, inputs, outputs of a dynamic model of the electric machine or the hydraulic machine and of a mechanical part and a hydrodynamic part, $u_c$ being the control of the force exerted by the electric machine or the hydraulic machine on the mobile system, w being control of the force exerted by the waves on the mobile system, u being exerted by the electric machine or the hydraulic machine on the mobile system and v being velocity of the mobile system in relation to the electric machine or the hydraulic machine.

8. A method as claimed in claim 3, wherein the dynamic model of the electric machine or the hydraulic machine is expressed with equations: $x_a = A_a^c x_a + B_a^c u_c$ and $u = C_a^c x_a$, and the model of a mechanical part and a hydrodynamic part as: $x_s = A_s^c x_s + B_s^c (w-u)$ and $v = C_s^c x_s$, with $x_a$ being a state vector of the electric machine or the hydraulic machine, $x_s$ being a state vector of the mechanical part and the hydrodynamic part, $A_a^c$, $B_a^c$, $C_a^c$, $A_s^c$, $B_s^c$ and $C_s^c$ being dynamic matrices, inputs, outputs of a dynamic model of the electric machine or the hydraulic machine and of a mechanical part and a hydrodynamic part, $u_c$ being the control of the force exerted by the electric machine or the hydraulic machine on the mobile system, w being control of the force exerted by the waves on the mobile system, u being exerted by the electric machine or the hydraulic machine on the mobile system and v being velocity of the mobile system in relation to the electric machine or the hydraulic machine.

9. A method as claimed in claim 2, wherein the dynamic model of the electric machine or the hydraulic machine is expressed with equations: $x_a = A_a^c x_a + B_a^c u_c$ and $u = C_a^c x_a$, and the model of a mechanical part and a hydrodynamic part as: $x_s = A_s^c x_s + B_s^c (w-u)$ and $v = C_s^c x_s$, with $x_a$ being a state vector of the electric machine or the hydraulic machine, $x_s$ being a state vector of the mechanical part and the hydrodynamic part, $A_a^c$, $B_a^c$, $C_a^c$, $A_s^c$, $B_s^c$ and $C_s^c$ being the dynamic matrices, inputs, outputs of a dynamic model of the electric machine or the hydraulic machine and of a mechanical part and a hydrodynamic part, $u_c$ being the control of the force exerted by the electric machine or the hydraulic machine on the mobile system, w being control of the force exerted by the waves on the mobile system, u being exerted by the electric machine or the hydraulic machine on the mobile system and v being velocity of the mobile system in relation to the electric machine or the hydraulic machine.

10. A method as claimed in claim 4, wherein a Kalman filter is synthesized from two linear models used by a state observer for observing a state of the mobile system.

11. A method as claimed in claim 7, wherein a Kalman filter is synthesized from two linear models used by a state observer for observing a state of the mobile system.

12. A method as claimed in claim 1, wherein efficiency η is a function of force u exerted by the electric machine or the hydraulic machine on the mobile system and of velocity v of the mobile system in relation to the electric machine or the hydraulic machine.

13. A method as claimed in claim 1, wherein the energy conversion efficiency η is calculated with a formula:

$$\eta(uv) = \begin{cases} \eta_0 & \text{if } uv \geq 0 \\ \dfrac{1}{\eta_0} & \text{if } uv < 0 \end{cases}$$

with $\eta_0$ being motor and generator efficiency of the electric machine or the hydraulic machine, with $0 \leq \eta_0 \leq 1$.

14. A method as claimed in claim 12, wherein energy conversion efficiency η is calculated with a formula:

$$\eta(uv) = -\frac{\frac{1}{\eta_0} - \eta_0}{\pi} \arctan\left(\frac{\pi r_a uv}{2}\right) + \frac{\frac{1}{\eta_0} - \eta_0}{2} + \eta_0$$

with $\eta_0$ being motor and generator energy conversion efficiency of the electric machine or the hydraulic machine, with $0 \leq \eta_0 \leq 1$, and $r_a$ being a smoothing parameter of the function.

15. A method as claimed in claim 13, wherein efficiency η is calculated with a formula:

$$\eta(uv) = -\frac{\frac{1}{\eta_0} - \eta_0}{\pi} \arctan\left(\frac{\pi r_a uv}{2}\right) + \frac{\frac{1}{\eta_0} - \eta_0}{2} + \eta_0$$

with $\eta_0$ being motor and generator energy conversion efficiency of the electric machine or the hydraulic machine, with $0 \leq \eta_0 \leq 1$, and $r_a$ being a smoothing parameter of the function.

16. A method as claimed in claim 1, wherein c), d) and e) are repeated for a model predictive control with a moving horizon.

\* \* \* \* \*